(12) United States Patent
Grinchuk (10) Patent No.: US 8,166,441 B2
(45) Date of Patent: Apr. 24, 2012

(54) LOW DEPTH CIRCUIT DESIGN

(75) Inventor: Mikhail I. Grinchuk, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 815 days.

(21) Appl. No.: 12/248,187

(22) Filed: Oct. 9, 2008

(65) Prior Publication Data

US 2009/0100390 A1    Apr. 16, 2009

Related U.S. Application Data

(60) Provisional application No. 60/979,529, filed on Oct. 12, 2007.

(51) Int. Cl.
*G06F 17/50* (2006.01)
(52) U.S. Cl. ........ 716/122; 716/119
(58) Field of Classification Search ........ 716/118–125
See application file for complete search history.

(56) References Cited

U.S. PATENT DOCUMENTS

| | | | |
|---|---|---|---|
| 6,691,283 B1 | 2/2004 | Gashkov et al. | |
| 6,934,733 B1 * | 8/2005 | Gashkov et al. | 708/706 |
| 7,020,865 B2 * | 3/2006 | Grinchuk et al. | 716/134 |
| 7,839,164 B1 * | 11/2010 | Grinchuk et al. | 326/38 |

OTHER PUBLICATIONS

S.B.Gashkov, M.I.Grinchuk, I.S.Sergeev. O postroenii skhem summatorov maloi glubiny (On the design of small-depth adders), in: Diskretnyi analiz i issledovanie operatsii (Discrete analysis and operation research), Series 1, vol. 14 (2007), #1, pp. 27-44. (In Russian). English translation of relevant pages also included in a separate document.

Jonh E. Savage, "The Complexity of Computing", John Wiley & Sons, 1976; Section 6.3.5, pp. 244-247, and Appendix to Chapter 6, pp. 276-283).

* cited by examiner

*Primary Examiner* — Nghia Doan
*Assistant Examiner* — Binh Tat
(74) *Attorney, Agent, or Firm* — Luedeka Neely Group, P.C.

(57) ABSTRACT

A method of designing a logic circuit based on one of the functions of the form $f_n = x_1 \lor (x_2 \& (x_3 \lor (x_4 \& \ldots x_n \ldots)))$ and $f'_n = x_1 \& (x_2 \lor (x_3 \& (x_4 \lor \ldots x_n \ldots)))$, by (a) selecting n as the number of variables of the logic circuit, (b) testing n against a threshold, (c) for values of n less than the threshold, using a first algorithm to design the logic circuit, (d) for values of n greater than the threshold, using a second algorithm to design the logic circuit.

11 Claims, 3 Drawing Sheets

Binary Comparator ($x > y$):

Fig. 5 (Prior Art)

Binary Adder ($z = x + y$):

Fig. 6 (Prior Art)

LOW DEPTH CIRCUIT DESIGN

FIELD

This application claims all rights and priority on U.S. provisional patent application 60/979,529 filed Oct. 12, 2007. This invention relates to the field of integrated circuit fabrication. More particularly, this invention relates to the design of integrated circuits.

BACKGROUND

Although digital circuits are typically constructed to accept data input—and provide data output—in a form that often appears to be analog or base ten, the circuits themselves operate in a binary domain. Thus, operations that appear relatively simple in base ten, often require many steps to be performed in binary. Although these steps are not complex in operation, they can easily grow to tens, hundreds, or thousands of individual steps that must be performed in order to implement the desired calculation. In a dedicated circuit, each of these individual steps requires a set of gates that must be fabricated in the integrated circuit.

As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

Thus, a good circuit design (in this context) is one that will generally reduce the number of gates that is required for a given calculation or reduce the number of stages of gates that is required for the calculation. This latter improvement is referred to as reducing the depth of the circuit, and it relates to the delay that is produced by the circuit. The greater the number of stages required by the circuit, the greater the circuit delay. Thus, good circuit designs not only require less space within the integrated circuit—because fewer gates are required—but also tend to produce results in a lesser period of time—because fewer stages are required (smaller depth). Thus, reducing at least one of the number of gates and the depth to perform a given calculation is highly desirable.

Examples of integrated circuits that tend to require a relatively large number of stages include adders, comparators, and counters of leading and trailing zeros and ones. When binary numbers having many digits are to be manipulated in this manner, a cascading series of gate circuits are typically employed. Circuit designs that reduce the depth of the circuit also tend to generally reduce the gate count of the circuit, thereby reducing the size of the circuit, the memory capacity required by the circuit, and the time required to implement the calculation.

Figure 5:
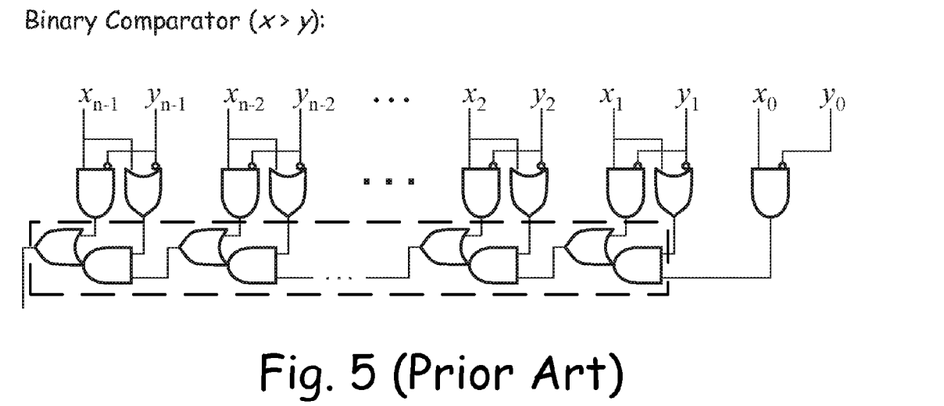
FIG. 5 is a prior art depiction of a binary comparator, showing the structure of the critical—or rate determining—path.
Figure 6:
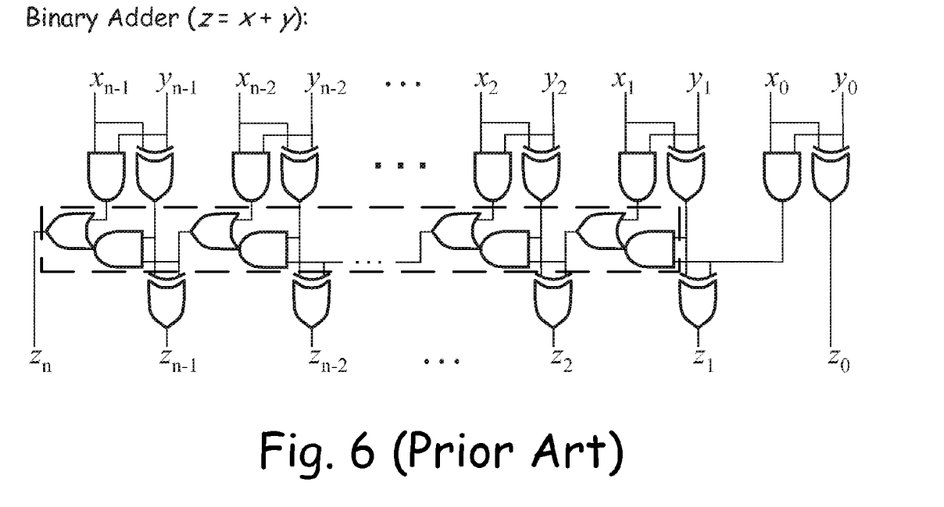
FIG. 6 is a prior art depiction of a binary adder, showing the structure of the critical—or rate determining—path.

FIG. 5 depicts a binary comparator for two binary numbers. Similarly, FIG. 6 depicts a binary adder for two binary numbers. In both cases, the critical path consists mostly of alternating AND and OR gates (this portion of the critical path is enclosed within the dashed box).

Many different methods have been devised to efficiently design such circuits under various constraints and with different optimization goals. For example, the "straightforward" method of a ripple carry adder produces a circuit that is extremely small in size, but with a depth of O(n), where n is the number of digits in the input binary numbers. Carry look-ahead adder, carry bypass adder, and carry select adder circuits contain more gates, but they are much faster. The best implementations have a depth of about $2 \log_2 n$. (Here and everywhere below, the depth is defined as the maximum number of two-input gates along paths from a circuit's inputs to its outputs, if the circuit cannot contain gates with more than two inputs). Khrapchenko developed a method in 1967 that produced circuits with a depth of $\log_2 n + \text{const} \times \sqrt{\log_2 n}$, but his method was efficient only for huge values of n. Others have produced methods with a depth of not more than $1.441 \log_2 n + \text{const}$ (in 2001) and $1.262 \log_2 n + \text{const}$ (in 2003), both with very small constant additive terms. Thus, even seemingly-small improvements can be very important in reducing the space and time required by such a circuit.

What is needed, therefore, is a method that overcomes issues such as those described above, at least in part.

SUMMARY

The above and other needs are met by a method of designing a logic circuit based on one of the functions of the form $f_n = x_1 \vee (x_2 \& (x_3 \vee (x_4 \& \ldots x_n \ldots)))$ and $f'_n = x_1 \& (x_2 \vee (x_3 \& (x_4 \vee \ldots x_n \ldots)))$, by (a) selecting n as the number of variables of the logic circuit, (b) testing n against a threshold, (c) for values of n less than the threshold, using a first algorithm to design the logic circuit, and (d) for values of n greater than the threshold, using a second algorithm to design the logic circuit.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The depth, and therefore the delay, of numerous important datapath operators (adders, comparators, counters of leading and trailing zeros and ones, etc.) is almost entirely defined by the implementation of functions of the form $f_n = x_1 \vee (x_2 \& (x_3 \vee (x_4 \& \ldots x_n \ldots)))$ or $f'_n = x_1 \& (x_2 \vee (x_3 \& (x_4 \vee \ldots x_n \ldots)))$, where $\vee$ is a logical OR function, and & is a logical AND function. There is described herein a new heuristic to generate low-depth circuit implementations of these functions. More precisely, the goal is to minimize maximal numbers of two-input (N)AND/(N)OR gates that are disposed along paths from inputs of the circuit to its outputs, provided that negations (NOT) are not counted and that no other gate types (such as XOR/XNOR gates and multi-input gates) are permitted. Using this method, there were found many optimal depth circuits. In this description, there are shown circuits with a depth of six for n=33, a depth of seven for n =60, a depth of eight for n=109, a depth of nine for n=202, and a depth of ten for n=375. These results produce a lower depth than all previously published methods.

Operators Depending on $F_N$

Addition

Let us consider addition of two binary numbers. If we write it as $$\begin{array}{c} \phantom{+} a_1 \quad a_2 \quad a_3 \quad \ldots \quad a_n \\ + \underline{\phantom{+} b_1 \quad b_2 \quad b_3 \quad \ldots \quad b_n} \\ s_0 \quad s_1 \quad s_2 \quad s_3 \quad \ldots \quad s_n \end{array}$$

then $s_i = a_i \oplus b_i \oplus c_{i+1}$ (for i>0), where $\oplus$ means XOR (addition modulo 2), and $c_i$ is the i-th carry bit; also $s_0 = c_1$.

When $c_i = 1$?

if ($a_i = 1$ & $b_i = 1$);
if ($a_i = 1 \lor b_i = 1$) & ($a_{i-1} = 1$ & $b_{i-1} = 1$);
if ($a_i = 1 \lor b_i = 1$) & ($a_{i-1} = 1 \lor b_{i-1} = 1$) & ($a_{i-2} = 1$ & $b_{i-2} = 1$);
if ($a_i = 1 \lor b_i = 1$)&($a_{i-1} = 1 \lor b_{i-1} = 1$)&($a_{i-2} = 1$ or $b_{i-2} = 1$)&($a_{i-3} = 1$ & $b_{i-3} = 1$); etc.

Let $x_i$ mean ($a_i = 1$ & $b_i = 1$), and let $y_i$ mean ($a_i = 1 \lor b_i = 1$). Using this notation, we can write:

$$c_i = x_i \lor$$
$$(y_i \, \& \, x_{i-1}) \lor$$
$$(y_i \, \& \, y_{i-1} \, \& \, x_{i-2}) \lor$$
$$(y_i \, \& \, y_{i-1} \, \& \, y_{i-2} \, \& \, x_{i-3}) \lor$$
$$\ldots$$
$$(y_i \, \& \, y_{i-1} \, \& \, y_{i-2} \, \& \, \ldots \, \& \, y_{n-1} \, \& \, x_n)$$
$$= x_i \lor (y_i \, \&(x_{i-1} \lor (y_{i-1} \, \& \, \ldots \, \&(x_{n-1} \lor (y_{n-1} \, \& \, x_n)) \ldots )))$$
$$= f_{2n-2i+1}(x_i, y_i, x_{i-1}, y_{i-1}, \ldots, x_{n-1}, y_{n-1}, x_n).$$

That is, the upper bound of the depth of an n-bit adder can be estimated as:

depth($f_{2n-1}$)+max(depth($\lor$), depth(&))+depth($\oplus$);

Note that the last two terms do not depend on n and are small (in our model, depth($\lor$)=depth(&)=1 and depth($\oplus$)=2).

Comparison

If A and B are written as ($a_1, a_2, a_3, \ldots, a_n$) and ($b_1, b_2, b_3 \ldots, b_n$), where index 1 corresponds to the most significant bit, then "A>B" is true in the following cases:

if $a_1 > b_1$;
if $a_1 = b_1$ and $a_2 > b_2$;
if $a_1 = b_1$ and $a_2 = b_2$ and $a_3 > b_3$; etc.

(Note that we can use "$\geq$" instead of "=" without changing the result. The only difference is that cases with "$\geq$" are not mutually exclusive.)

Let $x_i$ mean $a_i > b_i$, and let $y_i$ mean either $a_i = b_i$ or $a_i \geq b_i$ (in other words, $y_i$ can have any value in the case of $a_i > b_i$)

Then A>B can be expressed as:

$$x_1 \lor (y_1 \, \& \, (x_2 \lor (y_2 \, \& \, \ldots \, \& \, (x_{n-1} \lor (y_{n-1} \, \& \, x_n)) \ldots )))=f_{2n-1}(x_1, y_1, x_2, y_2, \ldots, x_{n-1}, y_{n-1}, x_n).$$

Thus, the depth of the n-bit comparison "A is greater than B" (and, obviously, "less than") has an upper bound of the form:

depth($f_{2n-1}$)+max(depth(>), depth($\geq$));

where both one-bit operations ">" and "$\geq$" have a depth of one. Comparison for "greater than or equal to" is almost the same, because it is just a complement (which is free in our model) of "less than."

Counting of Leading and Trailing Ones and Zeros

All four variants of such a counting operation are essentially identical, and thus we'll analyze only a counting operation of leading ones in the binary vector $A=(a_1, a_2, a_3, \ldots, a_n)$. Let's start with the least significant bit in the number of leading ones, or, in other words, let's find whether it is odd or even. It is even in the following cases:

if $a_1 = 0$;
if $a_1 = a_2 = 1$ and $a_3 = 0$;
if $a_1 = a_2 = a_3 = a_4 = 1$ and $a_5 = 0$;
if $a_1 = a_2 = a_3 = a_4 = a_5 = a_6 = 1$ and $a_7 = 0$; etc.

Let $x_i$ (i=1, 2, 3, . . . ) mean "$a_{2i-1}=0$", and let $y_i$ mean "$a_{2i-1}=a_{2i}=1$", i.e. $x_i = \neg a_{2i-1}$ and $y_i = (a_{2i-1} \, \& \, a_{2i})$. Then the set of above-mentioned conditions can be rewritten as:

$$x_1 \lor (y_1 \, \& \, (x_2 \lor (y_2 \, \& \, \ldots \, \& \, (x_{(n-1)/2} \lor (y_{(n-1)/2} \, \& \, x_{(n+1)/2n})) \ldots ))) = f_n(x_1, y_1, x_2, y_2, \ldots, x_{(n-1)/2}, y_{(n-1)/2}, x_{(n+1)/2})$$

if n is an odd number, or if n is an even number:

$$x_1 \lor (y_1 \, \& \, (x_2 \lor (y_2 \, \& \, \ldots \, \& \, (x_{n/2} \lor y_{n/2}) \ldots ))) = f_n(x_1, y_1, x_2, y_2, \ldots, x_{n/2}, y_{n/2})$$

The second least significant bit in the number of leading ones can be expressed in a similar way as $f_{[n/2]}(x'_1, y'_1, x'_2, y'_2, \ldots )$, where $x'_i = \neg y_{2i-1}$ and $y'_i = (y_{2i-1} \, \& \, y_{2i})$; then the third least significant bit can be expressed in a similar way as $f_{[n/4]}(x''_1, y''_1, x''_2, y''_2 \ldots )$, where $x''_i = \neg y'_{2i-1}$ and $y''_i = (y'_{2i-1} \, \& \, y'_{2i})$.

Overview of Depth-Efficient Implementations of $f_n$

The present method is based on an automated search of solutions in a special class of circuits; it is much faster than a full search among all possible circuits, but probably gives the best possible circuits or at least very good circuits (because it covers all other known methods). Calculations up to n=2,000,000 inputs have been accomplished (probably covering all practical needs) and a table of values of depth($f_n$) prepared. New circuits produced in this manner are never worse (in terms of the depths) than any previously known ones, and in some cases they eventually supersede the older circuit designs, such as at:

30<n<34,
57<n<61,
91<n<110,
172<n<203,
273<n<376,
516<n<699,
820<n<1312,
1549<n<4646, and
for all n>4647.

Under the following conditions, prior-published results are also superseded:

327<n<376,
606<n<699,
982<n<1312,
1819<n<2467,
2946<n<4546,
5457<n<8783, and
for all n>8839.

The table below compares some prior art methods with the present method. For each depth d, the numbers in the table show the maximum n such that n-input circuits produced by a particular method have a depth d or less; values shown in italics are the result of extrapolation. Thus, larger numbers in the table below represent larger numbers of n for a given depth, and therefore represent better designs.

| d | Old Method 1 | Old Method 2 | Old Method 3 | Present Method |
|---|---|---|---|---|
| 0 |  | 1 | 1 | 1 |
| 1 | 1 |  | 2 | 2 |
| 2 |  | 3 | 3 | 3 |
| 3 | 3 | 5 | 6 | 6 |
| 4 |  | 9 | 10 | 10 |
| 5 | 7 | 15 | 19 | 19 |
| 6 | 15 | 25 | 30 | 33 |
| 7 |  | 41 | 57 | 60 |
| 8 | 31 | 67 | 91 | 109 |
| 9 | 63 | 109 | 172 | 202 |
| 10 | 127 | 177 | 273 | 375 |
| 11 |  | 287 | 516 | 698 |
| 12 | 255 | 465 | 820 | 1311 |
| 13 | 511 | 753 | 1549 | 2466 |
| 14 | 1023 | 1219 | 2460 | 4645 |
| 15 | 2047 | 1973 | 4647 | 8782 |
| 16 |  | 3193 | 7381 | 16627 |
| 17 | 4095 | 5167 | 13942 | 31548 |
| 18 | 8191 | 8361 | 22143 | 60059 |
| 19 | 16383 | 13529 | 41826 | 114648 |
| 20 | 32767 | 21891 | 66430 | 219163 |
| 21 | 65535 | 35421 | 125479 | 419824 |
| 22 |  | 57313 | 199290 | 805451 |
| 23 | 131071 | 92735 | 376437 | 1547366 |
| 24 | 262143 | 150049 | 597871 | 3.0E6 |
| 25 | 524287 | 242785 | 1129312 | 5.8E6 |
| 26 | 1048575 | 392835 | 1793613 | 11E6 |
| 27 | 2097151 | 635621 | 3387936 | 22E6 |
| 28 | 4194303 | 1028457 | 5380840 | 42E6 |
| 29 |  | 1664079 | 10163809 | 81E6 |
| 30 | 8388607 | 2692537 | 16142520 | 160E6 |
| 31 | 16777215 | 4356617 | 30491427 | 300E6 |
| 32 | 33554431 | 7049155 | 48427561 | 590E6 |

Figure 1:
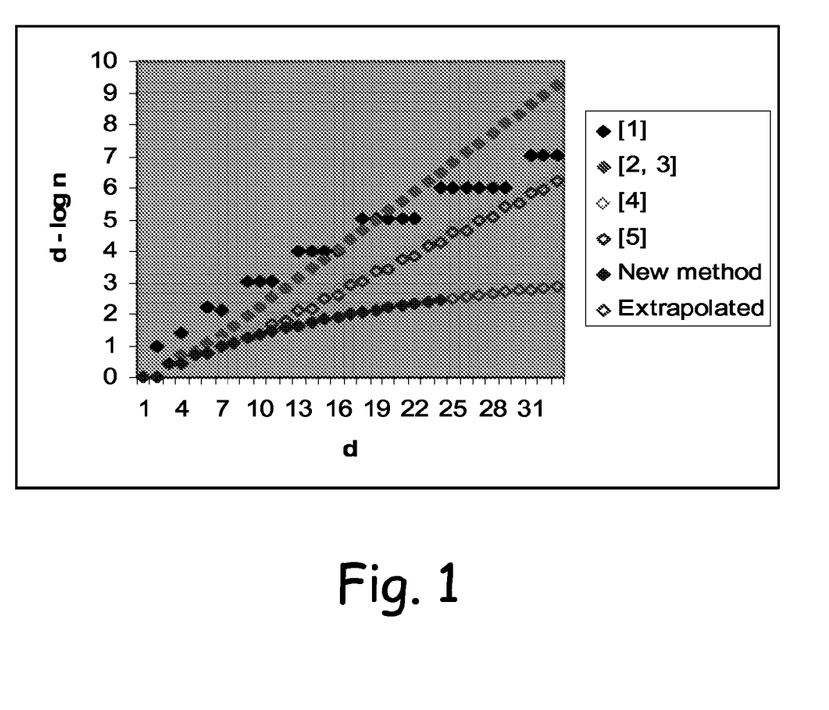
FIG. 1 is a chart depicting the comparison of depth overhead for five different methods.

Thus, the present method provides an improved design for all investigated depths. In graphical form, the behavior of these methods is shown in FIG. 1. Depth d of an n-input function cannot be less than about $\log_2 n$, and in the case of the present method, $f_n$ is actually close to $\log_2 n$, that is, the "quality" of the circuits produced can be more clearly shown in terms of $d - \log_2 n$ as a function of d.

Figure 2:
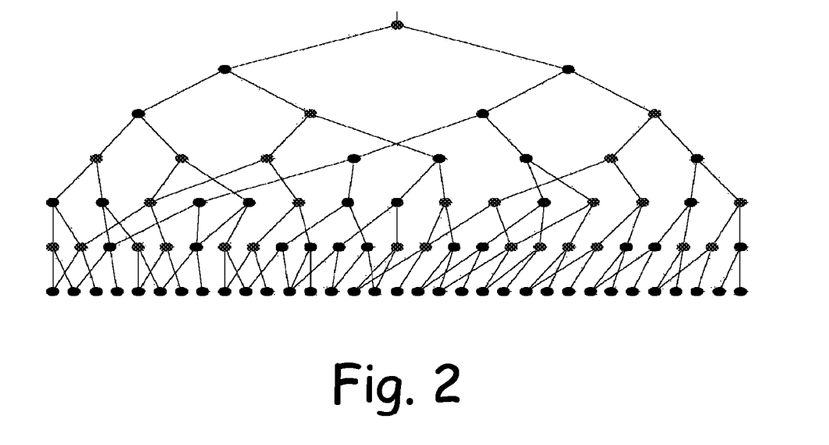
FIG. 2 is a chart depicting the implementation of $f_n$ and $f'_n$ for n=33, according to an embodiment of the present invention.
Figure 3:
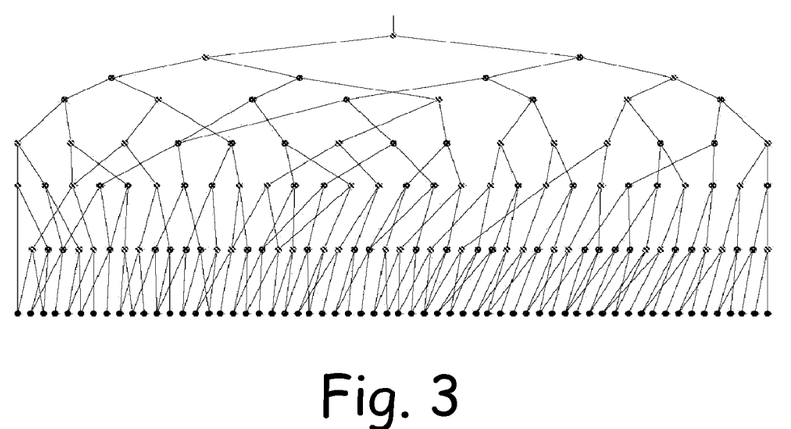
FIG. 3 is a chart depicting the implementation of $f_n$ and $f'_n$ for n=60, according to an embodiment of the present invention.
Figure 4:
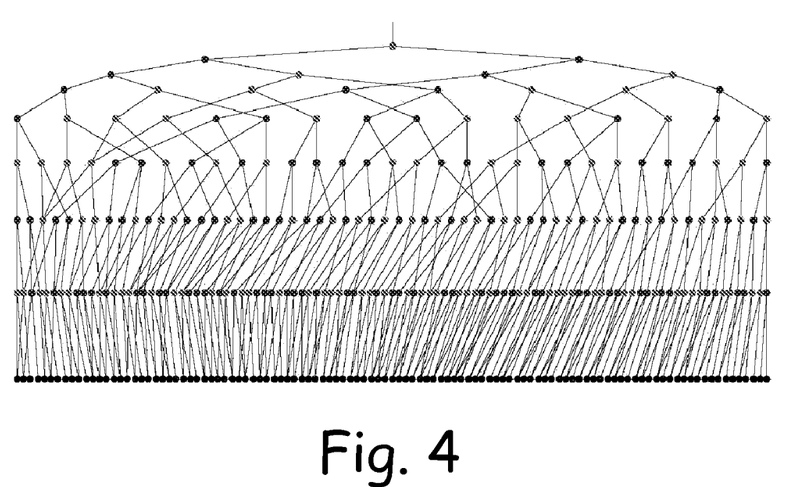
FIG. 4 is a chart depicting the implementation of $f_n$ and $f'_n$ for n=109, according to an embodiment of the present invention.

Examples of the new circuits for $f_n$ and $f'_n$ with n=33, n=60, n=109, n=202 and n=375 are described below in detail. In addition, circuits for n=33, n=60 and n=109 are shown in FIGS. 2, 3, and 4 respectively. Black dots (squares) represent inputs ($x_1$ to $x_n$, from the left to the right), red (circles) and blue (triangles) dots represent OR and AND gates for $f_n$ and vice-versa for $f'_n$. These circuits are not optimized for size; this can be done by some modification of the method.

Further Discussion

The methods used to generate the circuits are described below. There are three algorithms that are used in the method, designated below as algorithms A, B, and C.

Algorithm A gives the exact solution (a minimum depth circuit under the above-specified restrictions). However, its runtime and memory requirements grow exponentially with N (memory is proportional to $2^N$, time to more than $4^N$), so it can only be used for values of N up to about twenty or thirty. Algorithm A is described in greater detail than B and C, because B and C are heuristic optimizations of algorithm A, with possible loss of accuracy, but with huge improvements in performance. It should be noted that algorithm A itself is not destined for practical circuit design. Instead, it plays an auxiliary role, serving as an "etalon" to demonstrate that a certain version of algorithm B produces results of expected quality.

Algorithm B is based on the observation that, among minimum depth circuits that can be found by algorithm A, there are such circuits where the function that is computed on each net satisfies extra limitations. Thus, the search is reduced only to those circuits that exhibit this special property. This reduces time and memory from exponential growth to polynomial growth (where memory is proportional to $N^3$, and time is about $N^{6+\epsilon}$). This method can be accomplished within a reasonable time for values of N up to about five hundred or one thousand.

Algorithm C is a further improvement based on an additional series of observations. It requires memory of a size equal to about $N^{1+\epsilon}$, and a computation time of about $N^{2+\epsilon}$, and can be accomplished within a reasonable time for values of N up to about one million.

Algorithm A

The input of the algorithm is the value N, and the output of the algorithm is a circuit for f_N (the circuit for f'_N is the same with replacing all AND's with OR's, and vice-versa). The internal variables include:

NN=$2^{N+1}$ (size of internal arrays)
HUGE=N+1
Integer array depth [0 . . . NN-1] (to store values between 0 and HUGE)
Integer arrays left [0 . . . NN-1] and right [0 . . . NN-1] with at least (N+1)-bit values
Array code [0 . . . NN-1] (to store values '&' and '|')
Array print_code[0 . . . NN-1] (to store values named ACTIVE, USED and PASSIVE)
Integer variables (indices) i, j, k, d with at least (N+1)-bit values In the description provided herein, decimal numbers are written without any additional notation, and binary numbers start with "#" (i.e. #1010=10 etc.), and have N+1 bits.

Pseudo-Code of Algorithm A (in A C-Like Style)

```
/* initialization phase */
for(i=0; i<NN; i++)
    {
        depth[i]=HUGE;
        print_code[i]=PASSIVE;
    }
/* Set N values of depth[ ] to 0, namely: */
depth[#0111111111...]=0;
depth[#1100000000...]=0;
depth[#1001111111...]=0;
depth[#1011000000...]=0;
depth[#1010011111...]=0;
depth[#1010110000...]=0;
depth[#1010100111...]=0;
depth[#1010101100...]=0;
...
/* the last index is either #1010...101001 or #1010...010110, depending
on the parity of N */
/* main loop: run until a circuit is found */
for(d=1; depth[#010101...]==HUGE; d++)
    {
        for(i=0; i<NN; i++)
            if(depth[i] == d-1)
                for(j=0; j<NN; j++)
                    if(depth[j] < d-1 || (depth[j]==d-1 && j<i))
                        {
                            k = i&j; /* bitwise AND */
                            if(depth[k] > d)
                                { depth[k]=d; left[k]=i; right[k]=j; code[k]='&'; }
                            k = i|j; /* bitwise OR */
```

-continued

```
        if(depth[k] > d)
            { depth[k]=d; left[k]=i; right[k]=j; code[k]='|'; }
        }
    }
/* printing phase */
i = #010101...;
print_code[i] = ACTIVE;
printf("output is f_%d\n", i);
while(1) /* a loop */
{
    find i such that print_code[i]==ACTIVE;
    if(such i does not exist) stop the algorithm; /* done */
    if(depth[i]==0)
        printf("f_%d is an input\n", i);
    else
        printf("f_%d = f_%d %c f_%d\n", i, left[i], code[i], right[i]);
    print_code[i] = USED;
    if(print_code[left[i]]==PASSIVE)
        print_code[left[i]]=ACTIVE;
    if(print_code[right[i]]==PASSIVE)
        print_code[right[i]]=ACTIVE;
}
```

Explanation of Algorithm A

Function $f_N$ (as well as $f'_N$) is a monotone Boolean function. Boolean function f is monotone if conditions $x_1 \leq y_1, \ldots, x_N \leq y_N$ lead to $f(x_1, \ldots, x_N) \leq f(y_1, \ldots, y_N)$. Each monotone Boolean function has so called "upper zeros" and "lower units." Vector argument $(x_1, \ldots, x_N)$ is an upper zero of monotone Boolean function f, if $f(x_1, \ldots, x_N)=0$ and $f(y_1, \ldots, y_N)=1$ for each $(y_1, \ldots, y_N)$ such that $x_1 \leq y_1, \ldots, x_N \leq y_N$ and at least one inequality is "<". Similarly, vector argument $(x_1, \ldots, x_N)$ is a lower unit of monotone Boolean function f, if $f(x_1, \ldots, x_N)=1$ and $f(y_1, \ldots, y_N)=0$ for each $(y_1, \ldots, y_N)$ such that $y_1 \leq x_1, \ldots, y_N \leq x_N$ and at least one inequality is "<". Monotone Boolean functions are fully defined by their upper zeros and lower units: in other words, if f and g are monotone Boolean functions, and $f(x_1, \ldots, x_N)=g(x_1, \ldots, x_N)$ for all $(x_1, \ldots, x_N)$ that are upper zeros of f or lower units of f, then f=g. Therefore, if a circuit built from AND and OR gates correctly computes a given monotone function f on all its upper zeros and lower ones, then it computes f everywhere.

All upper zeros and lower units of the present function $f_N$ are listed here (these are N+1 vectors of size N bits):
   v1=0111111111 ... (upper 0)
   v2=1100000000 ... (lower 1)
   v3=1001111111 ... (upper 0)
   v4=1011000000 ... (lower 1)
   v5=1010011111 ... (upper 0)
   v6=1010110000 ... (lower 1)
   v7=1010100111 ... (upper 0)
   v8=1010101100 ... (lower 1)

The last vector v(N+1) is either an upper zero 101010...1010 or a lower unit 101010...0101, depending on the parity of N.

Let (N+1)-bit vector of values $(f(v1), \ldots, f(v(N+1)))$ be called a passport of function of f. Our $f_N$ has passport (010101 ...), and (from the above) there is no other monotone Boolean function with the same passport. Variables $x_1, \ldots, x_N$ are monotone functions themselves, and they have passports:
   (0111111111 ...)
   (1100000000 ...)
   (1001111111 ...)
   (1011000000 ...)
   (1010011111 ...)
   (1010110000 ...)
   (1010100111 ...)
   (1010101100 ...)

The last passport is either (1010 ... 101001) or (1010 ... 010110), depending on the parity of N. Passports of functions are used as indices of arrays in the algorithm, and in the initialization phase, the depth of each input variable is declared to be zero. Note that logical operations on functions directly correspond to bitwise operations on their passports. For example, if $f(x_1, \ldots, x_N)=g(x_1, \ldots, x_N) \& h(x_1, \ldots, x_N)$ for all $(x_1, \ldots, x_N)$, then passport(f)=passport(g) & passport(h). The same is true for "|" instead of "&".

Then we are searching functions f of depth one. They are either f=g&h or f=g|h where g and h have a depth of zero. For example, let passports of f, g, and h be specified as k, i, and j, respectively. If depth[i]=0 and depth[j]=0, then depth[k] cannot be larger than one.

Next we search for functions f that have a depth of two. Again, they are either f=g&h or f=g|h, where g and h have a depth of zero or one, and at least one of g and h has a depth of one (using symmetry, we may specify that it is g that has a depth of one). That is, if depth[i]=1 and depth[j]≤1, then depth[k] cannot be larger than two.

Similarly, we continue the process described above for depths of 3, 4, 5, and so forth, until there is encountered a function that has a passport of (010101 ... ), which is f_N. During these computations, we preserve the implementation (for each f, we save passports of g and h as well as the operation, "&" or "|").

The final stage is just a printout of the expansion of $f_N$, starting from $f_N$. In the array print_code, we keep information about subfunctions that have yet to be printed (ACTIVE), are already printed (DONE), and are not yet used (PASSIVE). For each ACTIVE function, we print one level of expansion, change ACTIVE to DONE, and mark subfunctions as ACTIVE if they were PASSIVE (if they are already ACTIVE or DONE, we do nothing, avoiding printing their expansions twice).

A randomized version of Algorithm A can be defined by replacing the two steps "if(depth[k]>d)" with "if(depth[k]>d|| (depth[k]==d && RND( )))," where RND( ) is a function that returns a random one-bit value. In this manner, if an alternative method to compute a subfunction with the same depth is discovered, then a random decision is made to select between the old and new expansions.

Algorithm B

This algorithm is based on a certain observation in regard to the passports. A finite length binary sequence is defined as being "1-good" if it has a form of 0000 ... , 1111 ... , 0101 ... or 1010.... Further, a finite length binary sequence is defined as being "n-good" if it is a concatenation of n 1-good segments. For example, binary sequence 10101100000 is 3-good (also 4-good, 5-good etc.) because it can be split into three 1-good segments as 10101-1-00000 (or 1010-11-00000, or 10101-10-0000). Let us define "n-restricted Algorithm B" (where n≥3) as the following modification of Algorithm A: in all arrays, we will use only those elements that have n-good binary expansions. That is, instead of a loop like:
   for(i=0; i<NN; i++)
   we will use:
   for(i=0; i<NN; i=next after i number with n-good expansion)

In addition, we replace the condition if (depth [k]>d) with if (k is n-good) if (depth [k]>d). That is, the n-restricted algorithm operates with the circuits such that passports of all subfunctions are n-good.

It is possible to implement an n-restricted algorithm B with a memory having a size of $O(N^{n-1})$—if, instead of plain arrays, a data structure corresponding to n-good indices only is used. In this case, the required time drops to $O(N^{2n-2+\epsilon})$.

For practical usage, a four-restricted algorithm B has been chosen, due to the following two experimental observations. On the one hand, for all small N (here "small" means "small enough to run through the Algorithm A"), four-restricted Algorithm B finds the same depth as Algorithm A does. On the other hand, for larger N, five-restricted and six-restricted etc. algorithms B find the same depth as four-restricted algorithm B does.

The four-restricted Algorithm B (the implementation optimized as described above) works in an acceptable amount of memory and an acceptable length of time for values of N up to about one thousand, which covers most practical needs. Larger values of N require yet another level of optimization, explained below as Algorithm C.

A randomized version of algorithm B can also be developed, using the step substitutions as described above in regard to the randomized version of algorithm A.

Example

Implementation of $f_{33}$ and Passports

In this description, inputs are indexed as x0 . . . x32, not x1 . . . x33. Names of the functions are given as "letter+index+optional modifier," where: "letter" is associated with the depth (0:x, 1:u, 2:v, 3:p, 4:q, 5:r, 6:f), "index" corresponds to the first input xi used in the subfunction, and "optional modifiers" (a and b) distinguish between different subfunctions with the same depth and index, like p0/p0a/p0b.

The inputs of the function are:

```
01111111111111111111111111111111 x0
11000000000000000000000000000000 x1
10011111111111111111111111111111 x2
10110000000000000000000000000000 x3
10100111111111111111111111111111 x4
10101100000000000000000000000000 x5
10101001111111111111111111111111 x6
10101011000000000000000000000000 x7
10101010011111111111111111111111 x8
10101010110000000000000000000000 x9
10101010100111111111111111111111 x10
10101010101100000000000000000000 x11
10101010101001111111111111111111 x12
10101010101011000000000000000000 x13
10101010101010011111111111111111 x14
10101010101010110000000000000000 x15
10101010101010100111111111111111 x16
10101010101010101100000000000000 x17
10101010101010101001111111111111 x18
10101010101010101011000000000000 x19
10101010101010101010011111111111 x20
10101010101010101010110000000000 x21
10101010101010101010100111111111 x22
10101010101010101010101100000000 x23
10101010101010101010101001111111 x24
10101010101010101010101011000000 x25
10101010101010101010101010011111 x26
10101010101010101010101010110000 x27
10101010101010101010101010100111 x28
10101010101010101010101010101100 x29
10101010101010101010101010100111 x30
10101010101010101010101010101100 x31
10101010101010101010101010101001 x32
```

Yielding subfunctions of depth 1 as:

```
01000000000000000000000000000000 u0 = x0 & x1
00011111111111111111111111111111 u0a = x0 & x2
```

-continued

```
11110000000000000000000000000000 u1 = x1 | x3
10100100000000000000000000000000 u4 = x4 & x5
10100001111111111111111111111111 u4a = x4 & x6
10101111000000000000000000000000 u5 = x5 | x7
10101010010000000000000000000000 u8 = x8 & x9
10101010000111111111111111111111 u8a = x8 & x10
10101010111100000000000000000000 u9 = x9 | x11
10101010101011111111111111111111 u11 = x11 | x12
10101010101110000000000000000000 u11a = x11 | x13
10101010101011100000000000000000 u13 = x13 | x15
10101010101010010000000000000000 u14 = x14 & x15
10101010101010000111111111111111 u14a = x14 & x16
10101010101010101101111111111111 u17 = x17 | x18
10101010101010101111000000000000 u17a = x17 | x19
10101010101010101000111111111111 u18 = x18 & x20
10101010101010101010010000000000 u20 = x20 & x21
10101010101010101010010010000000 u22 = x22 & x23
10101010101010101010100001111111 u22a = x22 & x24
10101010101010101010101101111111 u25 = x25 | x26
10101010101010101010101111000000 u25a = x25 | x27
10101010101010101010101010010000 u28 = x28 & x29
10101010101010101010101010100000111 u28a = x28 & x30
1010101010101010101010101010101101 u31 = x31 | x32
```

Subfunctions of depth 2 are:

```
01011111111111111111111111111111 v0 = u0 | u0a
00000001111111111111111111111111 v0a = u0a & u4a
11110100000000000000000000000000 v1 = u1 | u4
11111111000000000000000000000000 v1a = u1 | u5
10101111010000000000000000000000 v5 = u5 | u8
10101010000101111111111111111111 v8 = u8a & u11
10101010111111110000000000000000 v9 = u9 | u13
10101010101110100000000000000000 v11 = u11a | u14
10101010101010001011111111111111 v14 = u14a & u17
10101010101010100111111111111111 v14a = u14a & u18
10101010101010101011101000000000 v17 = u17a | u20
10101010101010101000001000000000 v18 = u18 & u22
10101010101010101010000101111111 v22 = u22a & u25
10101010101010101010101111010000 v25 = u25a | u28
10101010101010101010101010000101 v28 = u28a & u31
```

Subfunctions of depth 3 are:

```
01010100000000000000000000000000 p0 = v0 & v1
00000001010000000000000000000000 p0a = v0a & v5
00000000001011111111111111111111 p0b = v0a & v8
11111111111111000000000000000000 p1 = v1a | v9
10101010111101011111111111111111 p11 = v11 | v14
10101010101000000000000101111111 p14 = v14a & v22
10101010101010111010100000000000 p17 = v17 | v18
10101010101010101010101111010101 p25 = v25 | v28
```

Subfunctions of depth 4 are:

```
01010101010000000000000000000000 q0 = p0 | p0a
00000000000101010111111111111111 q0a = p0b & p11
11111111111111111010100000000000 q1 = p1 | p17
10101010101000000000000101010101 q14 = p14 & p25
```

Subfunctions of depth 5 are:

```
01010101010101010111111111111111 r0 = q0 | q0a
11111111111111111010101010101010101 r1 = q1 | q14
``` and the final function, having a depth of 6 is:
0101010101010101010101010101010101 f=r0 & r1

As can be seen, all these passports are four-good and have the form of either:

... xyxyyyy ... yyyxyxyxy ... xyxyxyyyyy ...

or:

... xyxyyyy ... yyyxyxyxy ... xyxyxxxxxxx ...

These special passports can be encoded by the four-tuples (a,b,c,d), where a+b+c+d=N+1, and nonnegative integers a,b,c,d represent lengths of four parts:

(a) Alternating 0/1 starting from 1 (as if the zone were continuing prefix 10).
(b) Repeating last constant.
(c) Alternating 0/1.
(d) Repeating last constant.

On the boundary between zones (line ... xyxyxxxx ...) we will resolve the ambiguity in the connection point to the favor of zone with alternating 0/1. Adding these "packed passports" to the functions listed above, with the following inputs:

```
01111111111111111111111111111111 ( 0,  0,  2, 32) x0
11000000000000000000000000000000 ( 1,  0,  2, 31) x1
10011111111111111111111111111111 ( 2,  0,  2, 30) x2
10110000000000000000000000000000 ( 3,  0,  2, 29) x3
10100111111111111111111111111111 ( 4,  0,  2, 28) x4
```

```
10101100000000000000000000000000 ( 5,  0,  2, 27) x5
10101001111111111111111111111111 ( 6,  0,  2, 26) x6
10101011000000000000000000000000 ( 7,  0,  2, 25) x7
10101010011111111111111111111111 ( 8,  0,  2, 24) x8
10101010110000000000000000000000 ( 9,  0,  2, 23) x9
10101010100111111111111111111111 (10,  0,  2, 22) x10
10101010101100000000000000000000 (11,  0,  2, 21) x11
10101010101001111111111111111111 (12,  0,  2, 20) x12
10101010101011000000000000000000 (13,  0,  2, 19) x13
10101010101010011111111111111111 (14,  0,  2, 18) x14
10101010101010110000000000000000 (15,  0,  2, 17) x15
10101010101010100111111111111111 (16,  0,  2, 16) x16
10101010101010101100000000000000 (17,  0,  2, 15) x17
10101010101010101001111111111111 (18,  0,  2, 14) x18
10101010101010101011000000000000 (19,  0,  2, 13) x19
10101010101010101010011111111111 (20,  0,  2, 12) x20
10101010101010101010110000000000 (21,  0,  2, 11) x21
10101010101010101010100111111111 (22,  0,  2, 10) x22
10101010101010101010101100000000 (23,  0,  2,  9) x23
10101010101010101010101001111111 (24,  0,  2,  8) x24
10101010101010101010101011000000 (25,  0,  2,  7) x25
10101010101010101010101010011111 (26,  0,  2,  6) x26
10101010101010101010101010110000 (27,  0,  2,  5) x27
10101010101010101010101010100111 (28,  0,  2,  4) x28
10101010101010101010101010101100 (29,  0,  2,  3) x29
10101010101010101010101010101001 (30,  0,  2,  2) x30
10101010101010101010101010101011 (31,  0,  2,  1) x31
10101010101010101010101010101010 (32,  0,  2,  0) x32
```

Yields the following subfunctions having a depth of 1:

```
01000000000000000000000000000000 ( 0,  0,  3, 31) u0   = x0  & x1
00011111111111111111111111111111 ( 0,  2,  2, 30) u0a  = x0  & x2
11110000000000000000000000000000 ( 1,  2,  2, 29) u1   = x1  | x3
10100100000000000000000000000000 ( 4,  0,  3, 27) u4   = x4  & x5
10100001111111111111111111111111 ( 4,  2,  2, 26) u4a  = x4  & x6
10101111000000000000000000000000 ( 5,  2,  2, 25) u5   = x5  | x7
10101010010000000000000000000000 ( 8,  0,  3, 23) u8   = x8  & x9
10101010000111111111111111111111 ( 8,  2,  2, 22) u8a  = x8  & x10
10101010111100000000000000000000 ( 9,  2,  2, 21) u9   = x9  | x11
10101010101101111111111111111111 (11,  0,  3, 20) u11  = x11 | x12
10101010101111000000000000000000 (11,  2,  2, 19) u11a = x11 | x13
10101010101111000000000000000000 (13,  2,  2, 17) u13  = x13 | x15
10101010101010010000000000000000 (14,  0,  3, 17) u14  = x14 & x15
10101010101010000111111111111111 (14,  2,  2, 16) u14a = x14 & x16
10101010101010101101111111111111 (17,  0,  3, 14) u17  = x17 | x18
10101010101010101111000000000000 (17,  2,  2, 13) u17a = x17 | x19
10101010101010101000011111111111 (18,  2,  2, 12) u18  = x18 & x20
10101010101010101010010000000000 (20,  0,  3, 11) u20  = x20 & x21
10101010101010101010100100000000 (22,  0,  3,  9) u22  = x22 & x23
10101010101010101010100001111111 (22,  2,  2,  8) u22a = x22 & x24
10101010101010101010101011111111 (25,  0,  3,  6) u25  = x25 | x26
10101010101010101010101111000000 (25,  2,  2,  5) u25a = x25 | x27
10101010101010101010101010010000 (28,  0,  3,  3) u28  = x28 & x29
10101010101010101010101010000111 (28,  2,  2,  2) u28a = x28 & x30
10101010101010101010101010101101 (31,  0,  3,  0) u31  = x31 | x32
```

Subfunctions of depth 2 are:

```
01011111111111111111111111111111 ( 0,  0,  4, 30) v0   = u0  | u0a
00000001111111111111111111111111 ( 0,  6,  2, 26) v0a  = u0a & u4a
11110100000000000000000000000000 ( 1,  2,  4, 27) v1   = u1  | u4
11111111000000000000000000000000 ( 1,  6,  2, 25) v1a  = u1  | u5
10101111010000000000000000000000 ( 5,  2,  4, 23) v5   = u5  | u8
10101010000101111111111111111111 ( 8,  2,  4, 20) v8   = u8a & u11
10101010111111110000000000000000 ( 9,  6,  2, 17) v9   = u9  | u13
10101010101110100000000000000000 (11,  2,  4, 17) v11  = u11a | u14
10101010101010001011111111111111 (14,  2,  4, 14) v14  = u14a & u17
10101010101010000000111111111111 (14,  6,  2, 12) v14a = u14a & u18
10101010101010101111010000000000 (17,  2,  4, 11) v17  = u17a | u20
10101010101010101000001000000000 (18,  4,  3,  9) v18  = u18 & u22
10101010101010101010000101111111 (22,  2,  4,  6) v22  = u22a & u25
```

-continued

| | | | | |
|---|---|---|---|---|
| 1010101010101010101010111101000 | (25, | 2, | 4, | 3) v25 = u25a \| u28 |
| 10101010101010101010101010000101 | (28, | 2, | 4, | 0) v28 = u28a & u31 |

Subfunctions with a depth of 3 are:

| | | | | |
|---|---|---|---|---|
| 01010100000000000000000000000000 | ( 0, | 0, 7, 27) | p0 = v0 & v1 |
| 00000001010000000000000000000000 | ( 0, | 6, 5, 23) | p0a = v0a & v5 |
| 00000000000101111111111111111111 | ( 0, 10, 4, 20) | p0b = v0a & v8 |
| 11111111111111100000000000000000 | ( 1, 14, 2, 17) | p1 = v1a \| v9 |
| 10101010101110101011111111111111 | (11, | 2, 7, 14) | p11 = v11 \| v14 |
| 10101010101000000000000101111111 | (14, 10, 4, 6) | p14 = v14a & v22 |
| 1010101010101011110101000000000 | (17, | 2, 6, 9) | p17 = v17 \| v18 |
| 10101010101010101010101111010101 | (25, | 2, 7, 0) | p25 = v25 \| v28 |

Subfunctions of depth 4 are:

| | | | |
|---|---|---|---|
| 01010101010000000000000000000000 | ( 0, 0, 11, 23) | q0 = p0 \| p0a |
| 00000000000101010101111111111111 | ( 0, 10, 10, 14) | q0a = p0b & p11 |
| 11111111111111111101010000000000 | ( 1, 18, 6, 9) | q1 = p1 \| p17 |
| 10101010101000000000000101010101 | (14, 10, 10, 0) | q14 = p14 & p25 |

Subfunctions of depth 5 are:

| | | | |
|---|---|---|---|
| 01010101010101010111111111111111 | (0, 0, 20, 14) | r0 = q0 \| q0a |
| 11111111111111111101010101010101 | (1, 18, 15, 0) | r1 = q1 \| q14 | and the final function, having a depth of 6 is:
01010101010101010101010101010101 (0, 0, 34, 0) f= r0 & r1

Note that the second element of these packed passports is always an even number.

Algorithm C

In this discussion, pp(f) represents a packed passport of function f. Further, if P=(a,b,c,d) is a packed passport and t is an integer number, then shift_t(P) is defined as (a+t,b,c,d−t). Algorithm C is based on the observation that if P=pp(f), P'=pp(f') where P'=shift_t(P), and f is expanded as f=g op h (here "op" is either "&" or "|"), then one of the functions f' with P'=pp(f') can be expanded as f'=g' op' h', where pp(g')=shift_t(pp(g)), pp(h')=shift_t(pp(h)), and op' is the same as op if t is even, and different from op otherwise.

For example (see above):

```
pp(p11) = (11,  2,  7, 14)
p11 = v11 | v14
pp(v11) = (11,  2,  4, 17)
pp(v14) = (14,  2,  4, 14)
pp(p25) = (25,  2,  7,  0) = shift_14(pp(p11))
shift_14(pp(v11)) = (25,  2,  4,  3) = pp(v25)
shift_14(pp(v14)) = (28,  2,  4,  0) = pp(v28)
```

Therefore, we expect that p25=v25|v28 (op'=op because 14 is an even number), and we actually have this equation.

The nature of this effect is, if we have a circuit with inputs indexed i1 ... ik, then adding t to all these indices and replacing (for t even) ANDs with ORs and vice-versa will produce the function with the passport shifted by t. The second observation is even simpler: if g and h are such that pp(g)=(x, ... ) and pp(h)=(y, ... ), then pp(g op h)=(min(x, y), ... ) (provided that pp(g op h) exists, of course).

The third observation is based on the properties of monotone Boolean functions, as next described. Let g and h be two functions with passports $(g_1 \ldots g_{N+1})$ and $(h_1 \ldots h_{N+1})$, respectively. Let f be a function with passport $(f_1 \ldots f_{N+1})$ equal to (0101 ... ). We'll say that g is "not worse" than h if each $g_i$ is either $h_i$ or $f_i$. Let S be a circuit built from AND and OR gates, computing f such that one of the subfunctions is h. Then, replacement of the gate computing h by a circuit computing g (i.e. function not worse than h) will not destroy the whole circuit: it will still compute f.

In terms of packed passports, the third observation can be used in the following form: if pp(g)=(a,b,c,d) and pp(h)=(a, b,c+t,d−t), where t is a nonnegative even integer, then h is not worse than g. Taking into account all three observations, we can say that it is enough to keep traces (for any given depth D and for a given b) only to the value c=c(b,D) which is maximum among all c such that functions with passport (0,b,c,N+ 1−b−c) have a depth that is not more than D.

A similar comparison can be made for parameter b: (a−t, b+t,c,d) is better than (a,b,c,d) if t is positive even number. Computation of these c(b,D) (for D=0, 1, 2, ... and for each b) we give in terms of sets S(D) of pairs <b, c>. The input of the algorithm C is the number N. The algorithm uses "sets of pairs," where each element of these sets has an additional field "history."

Pseudo-Code of Algorithm C

```
S(0) = empty set;
/* all input variables have packed passports with b=0 and c=2 */
add_to(S(0), pair(0,2));
printf("d=0: <0,2>\n\n");
for(D = 0; S(D) does not contain pair (0,y) with y>N; D++)
    {
    S(D+1) = S(D);
    for each pair(x,y) in S(D)
        if(y is even)
```

```
        {
            (xx,yy) = pair in S(D)
                    such that xx>=y-2 and yy is maximum possible;
            if(there is no such (xx,yy))
                break; /* exit from the inner loop */
            printf("<%d,%d> + {1}shift_%d<%d,%d> =>
                        <%d,%D>\n", x,y,x+1,y-2,yy,x,y+yy-1);
            add_to(S(D+1), pair(x, y+yy-1));
            printf("<%d,%d> + {1}shift_%d<%d,%d> =>
                        <%d,%D>\n", x,y,x+1,y-2,yy-1,x,y+yy-2);
            add_to(S(D+1), pair(x, y+yy-2));
        }
        x = maximum x-component of pairs in S(D);
        for each pair(xx,yy) in S(D)
        {
            printf("<%d,2> + {1}shift_%d<%d,%d> => <%d,%>",
                        x, x+2, xx, yy, x+xx+2, yy);
            add_to(S(D+1), pair(x+xx+2, yy));
        }
        yy = maximum y-component of pairs in S(D);
        (x,y) = pair in S(D) such that x=yy-1 and y is maximum possible;
        if(there exists such (x,y))
        {
            printf("<%d,%d> + {0}shift_0<0,%d> => <0,%d>",
                        yy-1, y, yy, y+yy-1);
            add_to(S(D+1), pair(0, y+yy-1));
        }
        printf("\nd=%d:", D+1);
        for each pair(x,y) in S(D+1)
            printf(" <%d,%d>", x, y);
        printf("\n\n");
    }
```

Here the operation "add_to" must keep the set containing only the best elements. In other words: (A) if we are adding pair (xx,yy) and the set contains (x,y) such that y≡yy (mod 2), x≧xx and y≧yy, then (xx,yy) will not be added (because the new pair is worse than one of the already existing pairs), and (B) if we are adding pair (xx,yy) and the set contains (x,y) such that y≡yy (mod 2), x≦xx and y≦yy, then (x,y) will be removed (because the new pair is better than this old existing pair)

This algorithm C includes only a few of the possible combinations of passports. It may, therefore, cause some loss of quality in the produced circuits, but even in this form, it is efficient enough to outperform all currently existing alternatives. The experimental results of calculation (provided in the table above) lead us to the hypothesis that the depth of N-input functions $f_N$ and $f'_N$ is $\log_2 N + \log_2 \log_2 N + \text{err}(N)$, where err(N) is limited by a small constant. All existing alternatives are either const×$\log_2 N$ with const>1 or $\log_2 N + O(\sqrt{\log_2 N})$.

Algorithm C produces an output such as given below (for a sample run of N=33; long lines are wrapped):

```
d=0:    <0,2>
<0,2> + {1}shift_1<0,2> => <0,3>
<0,2> + {1}shift_2<0,2> => <2,2>
d=1:    <2,2> <0,3>
<2,2> + {1}shift_3<0,3> => <2,4>
<2,2> + {1}shift_3<0,2> => <2,3>
<2,2> + {1}shift_4<2,2> => <6,2>
<2,2> + {1}shift_4<0,3> => <4,3>
<2,2> + {0}shift_0<0,3> => <0,4>
d=2:    <6,2> <4,3> <2,4>
<6,2> + {1}shift_7<0,4> => <6,5>
<6,2> + {1}shift_7<0,3> => <6,4>
<2,4> + {1}shift_3<2,4> => <2,7>
<2,4> + {1}shift_3<2,3> => <2,6>
<6,2> + {1}shift_8<6,2> => <14,2>
<6,2> + {1}shift_8<4,3> => <12,3>
<6,2> + {1}shift_8<2,4> => <10,4>
d=3:    <14,2> <12,3> <10,4> <6,5> <2,6> <2,7>
<14,2> + {1}shift_15<0,7> => <14,8>
<14,2> + {1}shift_15<0,6> => <14,7>
<10,4> + {1}shift_11<2,7> => <10,10>
<10,4> + {1}shift_11<2,6> => <10,9>
<2,6> + {1}shift_3<4,5> => <2,10>
<2,6> + {1}shift_3<4,4> => <2,9>
<14,2> + {1}shift_16<14,2> => <30,2>
<14,2> + {1}shift_16<12,3> => <28,3>
<14,2> + {1}shift_16<10,4> => <26,4>
<14,2> + {1}shift_16<6,5> => <22,5>
<14,2> + {1}shift_16<2,6> => <18,6>
<14,2> + {1}shift_16<2,7> => <18,7>
<6,5> + {0}shift_0<0,7> => <0,11>
d=4:    <30,2> <28,3> <26,4> <22,5> <18,6> <18,7> <14,8>
<10,9> <10,10> <0,11>
<30,2> + {1}shift_31<0,11> => <30,12>
<30,2> + {1}shift_31<0,10> => <30,11>
<26,4> + {1}shift_27<2,10> => <26,13>
<26,4> + {1}shift_27<2,9> => <26,12>
<18,6> + {1}shift_19<4,10> => <18,15>
<18,6> + {1}shift_19<4,9> => <18,14>
<14,8> + {1}shift_15<6,10> => <14,17>
<14,8> + {1}shift_15<6,9> => <14,16>
<10,10> + {1}shift_11<8,10> => <10,19>
<10,10> + {1}shift_11<8,9> => <10,18>
<30,2> + {1}shift_32<30,2> => <62,2>
<30,2> + {1}shift_32<28,3> => <60,3>
<30,2> + {1}shift_32<26,4> => <58,4>
<30,2> + {1}shift_32<22,5> => <54,5>
<30,2> + {1}shift_32<18,6> => <50,6>
<30,2> + {1}shift_32<18,7> => <50,7>
<30,2> + {1}shift_32<14,8> => <46,8>
<30,2> + {1}shift_32<10,9> => <42,9>
<30,2> + {1}shift_32<10,10> => <42,10>
<30,2> + {1}shift_32<0,11> => <32,11>
<10,10> + {0}shift_0<0,11> => <0,20>
d=5:    <62,2> <60,3> <58,4> <54,5> <50,6> <50,7> <46,8>
<42,9> <42,10> <32,11> <30,12> <26,13> <18,14> <18,15>
<14,16> <14,17> <10,18> <10,19> <0,20>
<62,2> + {1}shift_63<0,20> => <62,21>
<62,2> + {1}shift_63<0,19> => <62,20>
<58,4> + {1}shift_59<2,19> => <58,22>
<58,4> + {1}shift_59<2,18> => <58,21>
<50,6> + {1}shift_51<4,19> => <50,24>
<50,6> + {1}shift_51<4,18> => <50,23>
<46,8> + {1}shift_47<6,19> => <46,26>
<46,8> + {1}shift_47<6,18> => <46,25>
<42,10> + {1}shift_43<8,19> => <42,28>
<42,10> + {1}shift_43<8,18> => <42,27>
<30,12> + {1}shift_31<10,19> => <30,30>
<30,12> + {1}shift_31<10,18> => <30,29>
<18,14> + {1}shift_19<12,17> => <18,30>
<18,14> + {1}shift_19<12,16> => <18,29>
<14,16> + {1}shift_15<14,17> => <14,32>
<14,16> + {1}shift_15<14,16> => <14,31>
<10,18> + {1}shift_11<16,15> => <10,32>
<10,18> + {1}shift_11<16,14> => <10,31>
<0,20> + {1}shift_1<18,15> => <0,34>
<0,20> + {1}shift_1<18,14> => <0,33>
<62,2> + {1}shift_64<62,2> => <126,2>
<62,2> + {1}shift_64<60,3> => <124,3>
<62,2> + {1}shift_64<58,4> => <122,4>
<62,2> + {1}shift_64<54,5> => <118,5>
<62,2> + {1}shift_64<50,6> => <114,6>
<62,2> + {1}shift_64<50,7> => <114,7>
<62,2> + {1}shift_64<46,8> => <110,8>
<62,2> + {1}shift_64<42,9> => <106,9>
<62,2> + {1}shift_64<42,10> => <106,10>
<62,2> + {1}shift_64<32,11> => <96,11>
<62,2> + {1}shift_64<30,12> => <94,12>
<62,2> + {1}shift_64<26,13> => <90,13>
<62,2> + {1}shift_64<18,14> => <82,14>
<62,2> + {1}shift_64<18,15> => <82,15>
<62,2> + {1}shift_64<14,16> => <78,16>
<62,2> + {1}shift_64<14,17> => <78,17>
<62,2> + {1}shift_64<10,18> => <74,18>
<62,2> + {1}shift_64<10,19> => <74,19>
<62,2> + {1}shift_64<0,20> => <64,20>
d=6:    <126,2> <124,3> <122,4> <118,5> <114,6> <114,7>
```

-continued

<110,8> <106,9> <106,10> <96,11> <94,12> <90,13> <82,14>
<82,15> <78,16> <78,17> <74,18> <74,19> <64,20> <62,21>
<58,22> <50,23> <50,24> <46,25> <46,26> <42,27> <42,28>
<30,29> <30,30> <14,31> <14,32> <0,33> <0,34>

This text can be traced back to produce a netlist. Namely, we start with the line <0,y> with maximum y (if y>N+1, we will first produce a netlist with more inputs than necessary, but they can be eliminated by substituting appropriate constants): d=6, <0,34>.

Expansion Step 1

Then we look for the same pair after the sign "=>":
<0,20>+{1}shift_1<18,15>=><0,34>

It means that functions for passport (x,0,34,*) are built as (x,0,20,*) op (x+1,18,15,*) where "op" is "&" for x=0,2, 4 . . . and "|" for x=1,3,5 . . . ("{1}" indicates it). In our case,
f_0_0_34=f_0_0_20 & f_1_18_15
where the indices are the shift amount and elements of the pair.

Expansion Step 2

Then, we look for <0,20> and <18,15> after "=>", etc.:

<10,10> + {0}shift_0<0,11> => <0,20>
<18,6> + {1}shift_19<4,10> => <18,15>

That is:
f_0_0_20=f_0_10_10|f_0_0_$_{11}$ ("|", because of "{0}")
f_1_18_15=f_1_18_6|f_20_4_10 ("&", because of "{1}" and the odd shift)

Expansion Step 3
<6,5>+{0}shift_0<0,7>=><0,11>
<4,10> is not available, so we have to look for the first (i.e. having minimum depth) <4+2n,10+2m>; in our case it is <10,10>

<10,4> + {1}shift_11<2,7> => <10,10>
<14,2> + {1}shift_16<2,6> => <18,6>

In Boolean form:
f_0_0_11=f_0_6_5|f_0_$_{0}$_$_{7}$
f_0_10_10=f_0_10_4 & f_11_2_7
f_1_18_6=f_1_14_2|f_17_2_6
f_20_4_10 is replaced by better one:
f_14_10_10=f_14_10_4 & f_25_2_7

Expansion Step 4
<0,7> is not available (first better candidate is <2,7>)

<2,4> + {1}shift_3<2,3> => <2,6>
<2,4> + {1}shift_3<2,4> => <2,7>
<6,2> + {1}shift_7<0,4> => <6,5>
<6,2> + {1}shift_8<2,4> => <10,4>
<6,2> + {1}shift_8<6,2> => <14,2>

In Boolean form, f_0_0_7 is replaced by (negative index is used temporarily)
f_−2_2_7=f_−2_2_4 & f_1_2_$_{13}$ 4.
Eliminating the negative index, replace f_−2_2_4 by f_0_0_4, producing actual expansion:
f_0_0_7=f_0_4 & f_1_2_4

The rest are given as:
f_0_6_5=f_0_6_2 & f_7_0_4
f_0_10_4=f_0_6_2 & f_8_2_4
f_1_14_2=f_1_6_2|f_9_6_2
f_11_2_7=f_11_2_4|f_14_2_4
f_14_10_4=f_14_6_2 & f_22_2_4
f_17_2_6=f_17_2_4|f_20_2_3
f_25_2_7=f_25_2_4|f_28_2_4

Expansion Step 5

<2,2> + {0}shift_0<0,3> => <0,4>
<2,2> + {1}shift_3<0,2> => <2,3>
<2,2> + {1}shift_3<0,3> => <2,4>
<2,2> + {1}shift_4<2,2> => <6,2>

In Boolean form:
f_0_0_4=f_0_2_2|f_0_0_3
f_0_6_2=f_0_2_2 & f_4_2_2
f_1_2_4=f_1_2_2|f_4_0_3
f_1_6_2=f_1_2_2|f$_{13}$_5_2_2
f_7_0_4=f_7_2_2 & f_7_0_3
f_8_2_4=f_8_2_2 & f_11_0_3
f_9_6_2=f_9_2_2|f_13_2_2
f_11_2_4=f_11_2_2|f_14_0_3
f_14_2_4=f_14_2_2 & f_17_0_3
f_14_6_2=f_14_2_2 & f_18_2_2
f_17_2_4=f_17_2_2|f_20_0_3
f_20_2_3=f_20_2_2 & f_23_0_2=f_20_2_2 & x23
f_22_2_4=f_22_2_2 & f_25_0_3
f_25_2_4=f_25_2_2|f_28_0_3
f_28_2_4=f_28_2_2 & f_31_0_3

Expansion Step 6

<0,2> + {1}shift_1<0,2> => <0,3>
<0,2> + {1}shift_2<0,2> => <2,2>

In Boolean form:
f_0_0_3=f_0_0_2 & f_1_0_2=x0 & x1
f_0_2_2=f_0_0_2 & f_2_0_2=x0 & x2
f_1_2_2=f_1_0_2|f_3_0_$_{−2}$=x1|x3
f_4_0_3=f_4_0_2 & f_5_0_2=x4 & x5
f_4_2_2=f_4_0_2 & f_6_0_2=x4 & x6
f_5_2_2=f_5_0_2|f_7_0_2=x5|x7
f_7_0_3=f_7_0_2|f_8_0_2=x7|x8
f_7_2_2=f_7_0_2|f_9_0_2=x7|x9
f_8_2_2=f_8_0_2 & f_10_0_2=x8 & x10
f_9_2_2=f_9_0_2|f_11_0_2=x9|x11
f_11_0_3=f_11_0_2|f_12_0_2=x11|x12
f_11_2_2=f_11_0_2|f_13_0_2=x11|x13
f_13_2_2=f_13_0_2|f_15_0_2=x13|x15
f_14_0_3=f_14_0_2 & f_15_0_2=x14 & x15
f_14_2_2=f_14_0_2 & f_16_0_2=x14 & x16
f_17_0_3=f_17_0_2|f_18_0_2=x17|x18
f_17_2_2=f_17_0_2|f_19_0_2=x17|x19
f_18_2_2=f_18_0_2 & f_20_0_2=x18 & x20
f_20_0_3=f_20_0_2 & f_21_0_2=x20 & x21
f_20_2_2=f_20_0_2 & f_22_0_2=x20 & x22
f_22_2_2=f_22_0_2 & f_24_0_2=x22 & x24
f_25_0_3=f_25_0_2|f_26_0_2=x25|x26
f_25_2_2=f_25_0_2|f_27_0_2=x25|x27
f_28_0_3=f_28_0_2 & f_29_0_2=x28 & x29
f_28_2_2=f_28_0_2 & f_30_0_2=x28 & x30 f_31_0_3=f_31_0_2|f_32_0_2=x31|x32

The resulting 33-input circuit differs from the one produced by Algorithm B, but it has the same depth of six.

Examples of Specific Values of N

Particular low-depth methods for computing functions out=$f_n(x_0, \ldots, x_{n-1})$ for n=33, 60, 109, 202 and 375 are given below. The inputs are numbered from $x_0$ to $x_{n-1}$; for $f_n$, replace "&" with "|" and vice-versa. All internal expressions named "f . . . " have a depth of three, "g . . . " have a depth of six, and "h . . . " have a depth of nine. Numerical indices of these subexpressions correspond to the first primary input used by them. Optional letter-modifier (a,b,c . . . ) is used to resolve possible ambiguities if the numerical index is the same.

33 Inputs, Depth=6

```
f0  = [(x0 & x1) | (x0 & x2)] & [(x1 | x3) | (x4 & x5)]
f0a = [(x0 & x2) & (x4 & x6)] & [(x5 | x7) | (x8 & x9)]
f0b = [(x0 & x2) & (x4 & x6)] & [(x8 & x10) & (x11 | x12)]
f1  = [(x1 | x3) | (x5 & x7)] | [(x9 | x11) | (x13 | x15)]
f11 = [(x11 | x13) | (x14 & x15)] | [(x14 & x16) & (x17 | x18)]
f14 = [(x14 & x16) & (x18 & x20)] & [(x22 & x24) & (x25 | x26)]
f17 = [(x17 | x19) | (x20 & x21)] | [(x18 & x20) & (x22 & x23)]
f25 = [(x25 | x27) | (x28 & x29)] | [(x28 & x30) & (x31 | x32)]
out = [(f0 | f0a) | (f0b & f11)] & [(f1 | f17) | (f14 & f25)]
```

60 Inputs, Depth=7

```
f0   = [x0 & (x1 | x2)] & [(x1 | x3) | (x4 & x5)]
f0a  = [(x0 & x2) & (x4 & x6)] & [(x5 | x7) | (x8 & x9)]
f0b  = [(x0 & x2) & (x4 & x6)] & [(x8 & x10) & (x11 | x12)]
f1   = [(x1 | x3) | (x5 & x7)] | [(x9 | x11) | (x13 | x15)]
f11  = [(x11 | x13) | (x14 & x15)] | [(x14 & x16) & (x17 | x18)]
f14  = [(x14 & x16) & (x18 & x20)] & [(x22 & x24) & (x25 | x26)]
f17  = [(x17 | x19) | (x20 & x21)] | [(x18 & x20) & (x22 & x23)]
f17a = [(x17 | x19) | (x21 | x23)] | [(x25 | x27) | (x29 | x31)]
f25  = [(x25 | x27) | (x28 & x29)] | [(x28 & x30) & (x31 | x32)]
f30  = [(x30 & x32) & (x33 | x34)] & [(x33 | x35) | (x36 & x37)]
f32  = [(x32 & x34) & (x36 & x38)] & [(x37 | x39) | (x40 & x41)]
f32a = [(x32 & x34) & (x36 & x38)] & [(x40 & x42) & (x43 | x44)]
f41  = [(x41 | x43) | (x45 | x47)] | [(x49 | x51) | (x52 & x53)]
f43  = [(x43 | x45) | (x46 & x47)] | [(x46 & x48) & (x49 | x50)]
```

```
f52  = [(x52 & x54) & (x55 | x56)] & [(x55 | x57) | (x58 & x59)]
g0   = [(f0 | f0a) | (f0b & f11)] & [(f1 | f17) | (f14 & f25)]
g1   = [(f1 | f17a) | (f30 | f32)] | [(f32a & f43) & (f41 | f52)]
out  = g0 & g1
```

109 Inputs, Depth=8

```
f0   = [(x0 & x1) | (x0 & x2)] & [(x1 | x3) | (x4 & x5)]
f0a  = [(x0 & x2) & (x4 & x6)] & [(x5 | x7) | (x8 & x9)]
f0b  = [(x0 & x2) & (x4 & x6)] & [(x8 & x10) & (x11 | x12)]
f0c  = [(x0 & x2) & (x4 & x6)] & [(x8 & x10) & (x12 & x14)]
f1   = [(x1 | x3) | (x5 & x7)] | [(x9 | x11) | (x13 | x15)]
f11  = [(x11 | x13) | (x14 & x15)] | [(x12 & x14) & (x16 & x17)]
f13  = [(x13 | x15) | (x17 | x19)] | [(x21 | x23) | (x24 & x25)]
f16  = [(x16 & x18) & (x19 | x20)] & [(x17 | x19) | (x21 | x22)]
f16a = [(x16 & x18) & (x20 & x22)] & [(x24 & x26) & (x28 & x30)]
f17  = [(x17 | x19) | (x21 | x23)] | [(x25 | x27) | (x29 | x31)]
f24  = [(x24 & x26) & (x27 | x28)] & [(x27 | x29) | (x30 & x31)]
f29  = [(x29 | x31) | (x32 & x33)] | [(x32 & x34) & (x35 | x36)]
f31  = [(x31 | x33) | (x35 | x37)] | [(x36 & x38) & (x39 | x40)]
f31a = [(x31 | x33) | (x35 | x37)] | [(x39 | x41) | (x42 & x43)]
f33  = [(x33 | x35) | (x37 | x39)] | [(x41 | x43) | (x45 | x47)]
f40  = [(x40 & x42) & (x44 & x46)] & [(x48 & x50) & (x51 | x52)]
f42  = [(x42 & x44) & (x45 | x46)] & [(x45 | x47) | (x48 & x49)]
f49  = [(x49 | x51) | (x53 | x55)] | [(x57 | x59) | (x60 & x61)]
f50  = [(x50 & x52) & (x54 & x56)] & [(x58 & x60) & (x62 & x64)]
f51  = [(x51 | x53) | (x54 & x55)] | [(x54 & x56) | (x57 | x58)]
f52  = [(x52 & x54) | (x56 & x58)] & [(x60 & x62) & (x63 | x64)]
f61  = [(x61 | x63) | (x65 | x67)] | [(x69 | x71) | (x72 & x73)]
f63  = [(x63 | x65) | (x66 & x67)] | [(x66 & x68) & (x69 | x70)]
f66  = [(x66 & x68) & (x70 & x72)] & [(x74 & x76) & (x78 & x80)]
f72  = [(x72 & x74) & (x75 | x76)] & [(x75 | x77) | (x78 & x79)]
f79  = [(x79 | x81) | (x82 & x83)] | [(x82 & x84) & (x85 | x86)]
f81  = [(x81 | x83) | (x85 | x87)] | [(x86 & x88) & (x89 | x90)]
f81a = [(x81 | x83) | (x85 | x87)] | [(x89 | x91) | (x92 & x93)]
f90  = [(x90 & x92) & (x94 & x96)] & [(x98 & x100) & (x101 | x102)]
f92  = [(x92 & x94) & (x95 | x96)] & [(x95 | x97) | (x98 & x99)]
f101 = [(x101 | x103) | (x104 & x105)] | [(x104 & x106) & (x107 | x108)]
g0   = [(f0 | f0a) | (f0b & f11)] | [(f0c & f16) & (f13 | f24)]
g0a  = [(f0c & f16a) & (f29 & f31)] & [(f31a | f42) | (f40 & f51)]
g1   = [(f1 | f17) | (f33 | f49)] | [(f52 & f63) & (f61 | f72)]
g51  = [(f50 & f66) & (f79 & f81)] & [(f81a | f92) | (f90 & f101)]
out  = (g0 | g0a) & (g1 | g51)
```

202 Inputs, Depth=9

```
f0   = [x0 & (x1 | x2)] & [(x1 | x3) | (x4 & x5)]
f0a  = [(x0 & x2) & (x4 & x6)] & [(x5 | x7) | (x8 & x9)]
f0b  = [(x0 & x2) & (x4 & x6)] & [(x8 & x10) & (x11 | x12)]
f1   = [(x1 | x3) | (x5 & x7)] | [(x9 | x11) | (x13 | x15)]
f11  = [(x11 | x13) | (x14 & x15)] | [(x14 & x16) & (x17 | x18)]
f14  = [(x14 & x16) & (x18 & x20)] & [(x22 & x24) & (x25 | x26)]
f17  = [(x17 | x19) | (x20 & x21)] | [(x18 & x20) & (x22 & x23)]
f17a = [(x17 | x19) | (x21 | x23)] | [(x25 | x27) | (x29 | x31)]
f25  = [(x25 | x27) | (x28 & x29)] | [(x28 & x30) & (x31 | x32)]
f30  = [(x30 & x32) & (x33 | x34)] & [(x33 | x35) | (x36 & x37)]
f32  = [(x32 & x34) & (x36 & x38)] & [(x37 | x39) | (x40 & x41)]
f32a = [(x32 & x34) & (x36 & x38)] & [(x40 & x42) & (x43 | x44)]
f33  = [(x33 | x35) | (x37 | x39)] | [(x41 | x43) | (x45 | x47)]
f41  = [(x41 | x43) | (x45 | x47)] | [(x49 | x51) | (x52 & x53)]
f43  = [(x43 | x45) | (x46 & x47)] | [(x46 & x48) & (x49 | x50)]
f49  = [(x49 | x51) | (x53 | x55)] | [(x57 | x59) | (x60 & x61)]
f49a = [(x49 | x51) | (x53 | x55)] | [(x57 | x59) | (x61 | x63)]
f50  = [(x50 & x52) & (x54 & x56)] & [(x58 & x60) & (x62 & x64)]
f52  = [(x52 & x54) & (x55 | x56)] & [(x53 | x55) | (x57 | x58)]
f52a = [(x52 & x54) & (x56 & x58)] & [(x60 & x62) & (x63 | x64)]
f61  = [(x61 | x63) | (x65 | x67)] | [(x69 | x71) | (x72 & x73)]
f63  = [(x63 | x65) | (x66 & x67)] | [(x66 & x68) & (x69 | x70)]
f65  = [(x65 | x67) | (x69 | x71)] | [(x73 | x75) | (x77 | x79)]
f66  = [(x66 & x68) & (x70 & x72)] & [(x74 & x76) & (x78 & x80)]
f72  = [(x72 & x74) & (x75 | x76)] & [(x75 | x77) | (x78 & x79)]
f79  = [(x79 | x81) | (x82 & x83)] | [(x82 & x84) & (x85 | x86)]
```

-continued f81 = [(x81 | x83) | (x85 | x87)] | [(x86 & x88) & (x89 | x90)]
f81a = [(x81 | x83) | (x85 | x87)] | [(x89 | x91) | (x92 & x93)]
f81b = [(x81 | x83) | (x85 | x87)] | [(x89 | x91) | (x93 | x95)]
f90 = [(x90 & x92) & (x94 & x96)] & [(x98 & x100) & (x101 | x102)]
f92 = [(x92 & x94) & (x95 | x96)] & [(x95 | x97) | (x98 & x99)]
f97 = [(x97 | x99) | (x101 | x103)] & [(x105 | x107) | (x108 & x109)]
f101 = [(x101 | x103) | (x104 & x105)] | [(x104 & x106) & (x107 | x108)]
f102 = [(x102 & x104) & (x106 & x108)] & [(x110 & x112) & (x114 & x116)]
f104 = [(x104 & x106) & (x108 & x110)] & [(x112 & x114) & (x116 & x118)]
f108 = [(x108 & x110) & (x111 | x112)] & [(x111 | x113) & (x114 & x115)]
f113 = [(x113 | x115) & (x117 | x119)] | [(x121 | x123) & (x124 & x125)]
f115 = [(x115 | x117) & (x118 & x119)] | [(x118 & x120) & (x121 | x122)]
f117 = [(x117 | x119) & (x121 | x123)] | [(x125 | x127) & (x129 | x131)]
f120 = [(x120 & x122) & (x124 & x126)] & [(x128 & x130) & (x132 & x134)]
f124 = [(x124 & x126) & (x127 | x128)] & [(x125 | x127) & (x129 | x130)]
f128 = [(x128 & x130) & (x132 & x134)] & [(x136 & x138) & (x139 | x140)]
f130 = [(x130 & x132) & (x133 | x134)] & [(x133 | x135) & (x136 & x137)]
f136 = [(x136 & x138) & (x140 & x142)] & [(x144 & x146) & (x147 | x148)]
f139 = [(x139 | x141) & (x142 & x143)] | [(x140 & x142) & (x144 & x145)]
f143 = [(x143 | x145) & (x147 | x149)] | [(x151 | x153) & (x155 | x157)]
f145 = [(x145 | x147) & (x149 | x151)] | [(x153 | x155) & (x156 & x157)]
f147 = [(x147 | x149) & (x150 & x151)] | [(x150 & x152) & (x153 | x154)]
f154 = [(x154 & x156) & (x158 & x160)] & [(x162 & x164) & (x165 | x166)]
f156 = [(x156 & x158) & (x159 | x160)] & [(x159 | x161) & (x162 & x163)]
f159 = [(x159 | x161) & (x163 | x165)] | [(x167 | x169) & (x171 | x173)]
f165 = [(x165 | x167) & (x168 | x169)] | [(x168 & x170) & (x171 | x172)]
f172 = [(x172 & x174) & (x175 | x176)] & [(x175 | x177) & (x178 | x179)]
f174 = [(x174 & x176) & (x178 & x180)] & [(x179 | x181) | (x182 & x183)]
f174a = [(x174 & x176) & (x178 & x180)] & [(x182 & x184) & (x185 | x186)]
f183 = [(x183 | x185) & (x187 | x189)] | [(x191 | x193) & (x194 & x195)]
f185 = [(x185 | x187) & (x188 | x189)] | [(x188 & x190) & (x191 | x192)]
f194 = [(x194 & x196) & (x197 | x198)] & [(x197 | x199) & (x200 & x201)]
g0 = [(f0 | f0a) | (f0b & f11)] & [(f1 | f17) | (f14 & f25)]
g1 = [(f1 | f17a) | (f30 | f32)] | [(f32a & f43) & (f41 & f52)]
g1a = [(f1 | f17a) | (f33 | f49)] | [(f52a & f63) & (f61 & f72)]
g1b = [(f1 | f17a) | (f33 | f49a)] | [(f65 | f81b) | (f97 | f108)]
g50 = [(f50 & f66) & (f79 & f81)] & [(f81a & f92) | (f90 & f101)]
g102 = [(f102 & f15) & (f13 | f124)] & [(f117 | f130) | (f128 & f139)]
g104 = [(f104 & f120) & (f136 & f147)] & [(f145 | f156) | (f154 & f165)]
g143 = [(f143 | f159) & (f172 | f174)] | [(f174a & f185) & (f183 | f194)]
out = [(g0 & g1) & (g1a & g50)] & [(g1b | g102) | (g104 & g143)]

375 Inputs, Depth=10 f0 = [(x0 & x1) | (x0 & x2)] & [(x1 | x3) | (x4 & x5)]
f0a = [(x0 & x2) & (x4 & x6)] & [(x5 | x7) | (x8 & x9)]
f0b = [(x0 & x2) & (x4 & x6)] & [(x8 & x10) & (x11 | x12)]
f0c = [(x0 & x2) & (x4 & x6)] & [(x8 & x10) & (x12 & x14)]
f1 = [(x1 | x3) | (x5 | x7)] | [(x9 | x11) | (x13 | x15)]
f11 = [(x11 | x13) & (x14 & x15)] | [(x12 & x14) & (x16 & x17)]
f13 = [(x13 | x15) & (x17 | x19)] | [(x21 | x23) & (x24 & x25)]
f16 = [(x16 & x18) & (x19 & x20)] & [(x17 | x19) & (x21 & x22)]
f16a = [(x16 & x18) & (x20 & x22)] & [(x24 & x26) & (x28 & x30)]
f17 = [(x17 | x19) & (x21 | x23)] | [(x25 | x27) & (x29 | x31)]
f24 = [(x24 & x26) & (x27 | x28)] & [(x27 | x29) | (x30 & x31)]
f29 = [(x29 | x31) & (x32 & x33)] | [(x32 & x34) & (x35 | x36)]
f31 = [(x31 | x33) & (x35 | x37)] | [(x36 & x38) & (x39 | x40)]
f31a = [(x31 | x33) | (x35 | x37)] | [(x39 | x41) | (x42 & x43)]
f32 = [(x32 & x34) & (x36 & x38)] & [(x40 & x42) & (x44 & x46)]
f33 = [(x33 | x35) | (x37 | x39)] | [(x41 | x43) | (x45 | x47)]
f40 = [(x40 & x42) & (x44 & x46)] & [(x48 & x50) & (x51 | x52)]
f42 = [(x42 & x44) & (x45 | x46)] & [(x45 | x47) | (x48 & x49)]
f48 = [(x48 & x50) & (x52 & x54)] & [(x56 & x58) & (x60 & x62)]
f49 = [(x49 | x51) | (x53 | x55)] | [(x57 | x59) | (x60 & x61)]
f49a = [(x49 | x51) | (x53 | x55)] | [(x57 | x59) | (x61 | x63)]
f50 = [(x50 & x52) & (x54 & x56)] & [(x58 & x60) & (x62 & x64)]
f51 = [(x51 | x53) | (x54 & x55)] | [(x54 & x56) & (x57 | x58)]
f52 = [(x52 & x54) & (x56 & x58)] & [(x60 & x62) & (x63 | x64)]
f61 = [(x61 | x63) | (x65 | x67)] | [(x69 | x71) | (x72 & x73)]
f63 = [(x63 | x65) & (x66 | x67)] | [(x66 & x68) & (x69 | x70)]
f64 = [(x64 & x66) & (x68 & x70)] & [(x72 & x74) & (x76 & x78)]
f65 = [(x65 | x67) | (x69 | x71)] | [(x73 | x75) | (x77 | x79)]
f66 = [(x66 & x68) & (x70 | x72)] & [(x74 & x76) & (x78 & x80)]
f72 = [(x72 & x74) & (x75 | x76)] & [(x75 | x77) | (x78 | x79)]
f79 = [(x79 | x81) & (x82 | x83)] | [(x82 & x84) & (x85 | x86)]
f80 = [(x80 & x82) & (x84 & x86)] & [(x88 & x90) & (x92 & x94)]

-continued f81 = [(x81 | x83) | (x85 | x87)] | [(x86 & x88) & (x89 | x90)]
f81a = [(x81 | x83) | (x85 | x87)] | [(x89 | x91) | (x92 & x93)]
f81b = [(x81 | x83) | (x85 | x87)] | [(x89 | x91) | (x93 | x95)]
f90 = [(x90 & x92) & (x94 & x96)] & [(x98 & x100) & (x101 | x102)]
f92 = [(x92 & x94) & (x95 | x96)] & [(x95 | x97) | (x98 & x99)]
f96 = [(x96 & x98) & (x100 & x102)] & [(x104 & x106) & (x108 & x110)]
f97 = [(x97 | x99) | (x101 | x103)] | [(x105 | x107) | (x108 & x109)]
f101 = [(x101 | x103) | (x104 & x105)] | [(x104 & x106) & (x107 | x108)]
f102 = [(x102 & x104) & (x106 & x108)] & [(x110 & x112) & (x114 & x116)]
f104 = [(x104 & x106) & (x108 & x110)] & [(x112 & x114) & (x116 & x118)]
f108 = [(x108 & x110) & (x111 | x112)] & [(x111 | x113) | (x114 & x115)]
f112 = [(x112 & x114) & (x116 & x118)] & [(x120 & x122) & (x124 & x126)]
f113 = [(x113 | x115) | (x117 | x119)] | [(x121 | x123) | (x124 & x125)]
f115 = [(x115 | x117) | (x118 & x119)] | [(x118 & x120) & (x121 | x122)]
f117 = [(x117 | x119) | (x121 | x123)] | [(x125 | x127) | (x129 | x131)]
f120 = [(x120 & x122) & (x124 & x126)] & [(x128 & x130) & (x132 & x134)]
f124 = [(x124 & x126) & (x127 | x128)] & [(x125 | x127) | (x129 | x130)]
f128 = [(x128 & x130) & (x132 & x134)] & [(x136 & x138) & (x139 | x140)]
f128a = [(x128 & x130) & (x132 & x134)] & [(x136 & x138) & (x140 & x142)]
f130 = [(x130 & x132) & (x133 | x134)] & [(x133 | x135) | (x136 & x137)]
f136 = [(x136 & x138) & (x140 & x142)] & [(x144 & x146) & (x147 | x148)]
f139 = [(x139 | x141) | (x142 & x143)] | [(x140 & x142) & (x144 & x145)]
f143 = [(x143 | x145) | (x147 | x149)] | [(x151 | x153) | (x155 | x157)]
f144 = [(x144 & x146) & (x148 & x150)] & [(x152 & x154) & (x156 & x158)]
f145 = [(x145 | x147) | (x149 | x151)] | [(x153 | x155) | (x156 & x157)]
f147 = [(x147 | x149) | (x150 & x151)] | [(x150 & x152) & (x153 | x154)]
f154 = [(x154 & x156) & (x158 & x160)] & [(x162 & x164) & (x165 | x166)]
f156 = [(x156 & x158) & (x159 | x160)] & [(x159 | x161) | (x162 & x163)]
f159 = [(x159 | x161) | (x163 | x165)] | [(x167 | x169) | (x171 | x173)]
f160 = [(x160 & x162) & (x164 & x166)] & [(x168 & x170) & (x172 & x174)]
f165 = [(x165 | x167) | (x168 & x169)] | [(x168 & x170) & (x171 | x172)]
f172 = [(x172 & x174) & (x175 | x176)] & [(x175 | x177) | (x178 & x179)]
f174 = [(x174 & x176) & (x178 & x180)] & [(x179 | x181) | (x182 & x183)]
f174a = [(x174 & x176) & (x178 & x180)] & [(x182 & x184) & (x185 | x186)]
f176 = [(x176 & x178) & (x180 & x182)] & [(x184 & x186) & (x188 & x190)]
f183 = [(x183 | x185) | (x187 | x189)] | [(x191 | x193) | (x194 & x195)]
f185 = [(x185 | x187) | (x188 & x189)] | [(x188 & x190) & (x191 | x192)]
f192 = [(x192 & x194) & (x196 & x198)] & [(x200 & x202) & (x203 | x204)]
f194 = [(x194 & x196) & (x197 | x198)] & [(x197 | x199) | (x200 & x201)]
f195 = [(x195 | x197) | (x199 | x201)] | [(x203 | x205) | (x207 | x209)]
f201 = [(x201 | x203) | (x205 | x207)] | [(x209 | x211) | (x212 & x213)]
f203 = [(x203 | x205) | (x206 & x207)] | [(x206 & x208) & (x209 | x210)]
f203a = [(x203 | x205) | (x207 | x209)] | [(x211 | x213) | (x215 | x217)]
f211 = [(x211 | x213) | (x215 | x217)] | [(x219 | x221) | (x223 | x225)]
f212 = [(x212 & x214) & (x215 | x216)] & [(x213 | x215) | (x217 | x218)]
f214 = [(x214 & x216) & (x218 & x220)] & [(x222 & x224) & (x225 | x226)]
f216 = [(x216 & x218) & (x219 | x220)] & [(x219 | x221) | (x222 & x223)]
f218 = [(x218 & x220) & (x222 & x224)] & [(x226 & x228) & (x230 & x232)]
f225 = [(x225 | x227) | (x228 & x229)] | [(x226 & x228) & (x230 & x231)]
f227 = [(x227 | x229) | (x231 | x233)] | [(x235 | x237) | (x239 | x241)]
f229 = [(x229 | x231) | (x233 | x235)] | [(x237 | x239) | (x240 & x241)]
f231 = [(x231 | x233) | (x234 & x235)] | [(x234 & x236) & (x237 | x238)]
f234 = [(x234 & x236) & (x238 & x240)] & [(x242 & x244) & (x246 & x248)]
f240 = [(x240 & x242) & (x243 | x244)] & [(x243 | x245) | (x246 & x247)]
f243 = [(x243 | x245) | (x247 | x249)] | [(x251 | x253) | (x255 | x257)]
f247 = [(x247 | x249) | (x250 & x251)] | [(x250 & x252) & (x253 | x254)]
sf249 = [(x249 | x251) | (x253 | x255)] | [(x254 & x256) & (x257 | x258)]
f249a = [(x249 | x251) | (x253 | x255)] | [(x257 | x259) | (x260 & x261)]
f258 = [(x258 & x260) & (x262 & x264)] & [(x266 & x268) & (x269 | x270)]
f259 = [(x259 | x261) | (x263 | x265)] | [(x267 | x269) | (x271 | x273)]
f260 = [(x260 & x262) & (x263 | x264)] & [(x263 | x265) | (x266 & x267)]
f269 = [(x269 | x271) | (x272 & x273)] | [(x272 & x274) & (x275 | x276)]
f272 = [(x272 & x274) & (x276 & x278)] & [(x280 & x282) & (x283 | x284)]
f275 = [(x275 | x277) | (x278 | x279)] | [(x276 & x278) & (x280 & x281)]
f276 = [(x276 & x278) & (x280 & x282)] & [(x284 & x286) & (x288 & x290)]
f278 = [(x278 & x280) & (x282 & x284)] & [(x286 & x288) & (x290 & x292)]
f283 = [(x283 | x285) | (x286 & x287)] | [(x284 & x286) & (x288 & x289)]
f287 = [(x287 | x289) | (x291 | x293)] | [(x295 | x297) | (x298 & x299)]
f289 = [(x289 | x291) | (x292 & x293)] | [(x292 & x294) & (x295 | x296)]
f291 = [(x291 | x293) | (x295 | x297)] | [(x299 | x301) | (x303 | x305)]
f294 = [(x294 & x296) & (x298 & x300)] & [(x302 & x304) & (x306 & x308)]
f298 = [(x298 & x300) & (x301 | x302)] & [(x299 | x301) | (x303 | x304)]
f302 = [(x302 & x304) & (x306 & x308)] & [(x310 & x312) & (x313 | x314)]
f304 = [(x304 & x306) & (x307 | x308)] & [(x307 | x309) | (x310 & x311)]
f310 = [(x310 & x312) & (x314 & x316)] & [(x318 & x320) & (x321 & x322)]
f313 = [(x313 | x315) | (x316 | x317)] | [(x314 & x316) & (x318 | x319)]
f317 = [(x317 | x319) | (x321 | x323)] | [(x325 | x327) | (x329 | x331)]
f319 = [(x319 | x321) | (x323 | x325)] | [(x327 | x329) | (x330 & x331)]
f321 = [(x321 | x323) | (x324 & x325)] | [(x324 & x326) & (x327 | x328)]
f328 = [(x328 & x330) & (x332 & x334)] & [(x336 & x338) & (x339 | x340)]

```
f330 = [(x330 & x332) & (x333 | x334)] & [(x333 | x335) | (x336 & x337)]
f333 = [(x333 | x335) | (x337 | x339)] | [(x341 | x343) | (x345 | x347)]
f339 = [(x339 | x341) | (x342 & x343)] | [(x342 & x344) & (x345 | x346)]
f346 = [(x346 & x348) & (x349 | x350)] & [(x349 | x351) | (x352 & x353)]
f348 = [(x348 & x350) & (x352 & x354)] & [(x353 | x355) | (x356 & x357)]
f348a = [(x348 & x350) & (x352 & x354)] & [(x356 & x358) & (x359 | x360)]
f357 = [(x357 | x359) | (x361 | x363)] | [(x365 | x367) | (x368 & x369)]
f359 = [(x359 | x361) | (x362 & x363)] | [(x362 & x364) & (x365 | x366)]
f368 = [(x368 & x370) & (x371 | x372)] & [(x369 | x371) | (x373 | x374)]
g0 = [(f0 | f0a) | (f0b & f11)] | [(f0c & f16) & (f13 | f24)]
g0a = [(f0c & f16a) & (f29 & f31)] & [(f31a | f42) | (f40 & f51)]
g0b = [(f0c & f16a) & (f32 & f48)] & [(f64 & f80) & (f96 & f112)]
g1 = [(f1 | f17) | (f33 | f49)] | [(f52 & f63) & (f61 | f72)]
g1a = [(f1 | f17) | (f33 | f49a)] | [(f65 | f81b) | (f97 | f108)]
g50 = [(f50 & f66) & (f79 & f81)] & [(f81a | f92) | (f90 & f101)]
g102 = [(f102 & f115) & (f113 | f124)] & [(f117 | f130) | (f128 & f139)]
g104 = [(f104 & f120) & (f136 & f147)] & [(f145 | f156) | (f154 & f165)]
g128 = [(f128a & f144) & (f160 & f176)] & [(f192 & f203) & (f201 | f212)]
g143 = [(f143 | f159) | (f172 | f174)] | [(f174a & f185) & (f183 | f194)]
g195 = [(f195 | f211) | (f227 | f243)] | [(f259 | f275) | (f272 & f283)]
g203 = [(f203a | f216) | (f214 & f225)] | [(f218 & f231) & (f229 | f240)]
g218 = [(f218 & f234) & (f247 & f249)] & [(f249a | f260) | (f258 & f269)]
g276 = [(f276 & f289) & (f287 | f298)] & [(f291 | f304) | (f302 & f313)]
g278 = [(f278 & f294) & (f310 & f321)] & [(f319 | f330) | (f328 & f339)]
g317 = [(f317 | f333) | (f346 | f348)] | [(f348a & f359) & (f357 | f368)]
h0 = [(g0 | g0a) & (g1 | g50)] & [(g1a | g102) | (g104 & g143)]
h0a = [(g0b & g128) & (g203 | g218)] & [(g195 | g276) | (g278 & g317)]
out = h0 | h0a
```

CONCLUSION

There is described a new method for generating fast adders, comparators, and some other datapath modules. A comparison with existing methods is presented, and some particular netlists produced by the new method are shown in detail. Thus, the present method is efficient for n up to millions of inputs. For smaller numbers of inputs, the present method re-discovers the best-known (smallest depth) circuits. For larger numbers of inputs, the present method produces better circuits (smaller depth) than all presently-known methods.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A processor-based method of designing a logic circuit based on one of the functions of the form:

$$f_n = x_1 \vee (x_2 \& (x_3 \vee (x_4 \& \ldots x_n \ldots))), \text{ and}$$

$$f'_n = x_1 \& (x_2 \vee (x_3 \& (x_4 \vee \ldots x_n \ldots))),$$

comprising the steps of:
a. selecting N as the number of variables of the logic circuit,
b. testing N against a threshold,
c. for values of N less than the threshold, using a first algorithm to design the logic circuit using the processor, where the first algorithm is a heuristic optimization of a base algorithm; adapted for reduced accuracy and enhanced speed of computation, and
d. for values of N greater than the threshold, using a second algorithm to design the logic circuit using the processor, where
the second algorithm is an n-restricted algorithm that uses, in all arrays of the base algorithm, only elements that have n-good binary expansions,
loops of the base algorithm having a form of for(i=0; i<NN; i++) are replaced with for(i=0; i<NN; i=next after i number with n-good expansion),
conditions of the base algorithm having a form of if(depth[k]>d) are replaced with if(k is n-good) if(depth[k]>d), and
the second algorithm operates with the logic circuits such that passports of all subfunctions are n-good, and
e. the base algorithm is characterized by a search of all possible combinations of the logic circuit, and a selection of the logic circuit having a lowest depth.

2. The method of claim 1, wherein n equals four.

3. The method of claim 1, wherein the logic circuit comprises data paths including at least one of binary adders, binary comparators, and locators of leading and trailing ones and zeros in binary numbers.

4. The method of claim 1, wherein the first algorithm is a modification of the base algorithm, where traces for any given depth D and for a given b are only kept to a value of c=c(b,D) that is maximum among all c such that functions with passport (0,b,c,N+1−b−c) have a depth that is not more than D.

5. The method of claim 1, wherein the base algorithm comprises selecting a preexisting design having the least number of variables that is greater than N, and simplifying the preexisting design for N variables by setting constants to unused inputs and applying constant propagation.

6. The method of claim 1, wherein the threshold is about 698.

7. A processor-based method of designing a logic circuit based on one of the functions of the form:

$f_n = x_1 \vee (x_2 \,\&\, (x_3 \vee (x_4 \,\&\, \ldots x_n \ldots)))$, and $f'_n = x_1 \,\&\, (x_2 \vee (x_3 \,\&\, (x_4 \vee \ldots x_n \ldots)))$, comprising the steps of:
a. selecting N as the number of variables of the logic circuit,
b. testing N against a first threshold,
c. for values of N less than the threshold, using a first algorithm to design the logic circuit using the processor, where the first algorithm is one of,
   i. a modification of a base algorithm that uses only elements that have n-good binary expansions, where:
      loops of the base algorithm having a form of for(i=0; i<NN; i++) are replaced with for(i=0; i<NN; i=next after i number with n-good expansion),
      conditions of the base algorithm having a form of if(depth[k]>d) are replaced with if(k is n-good) if(depth[k]>d), and
      the second algorithm operates with the logic circuits such that passports of all subfunctions are n-good, and
   ii. a modification of the base algorithm, where traces for any given depth D and for a given b are only kept to a value of c=c(b,D) that is maximum among all c such that functions with passport (0,b,c,N+1−b−c) have a depth that is not more than D, and
d. the base algorithm is characterized by a search of all possible combinations of the logic circuit, and a selection of the logic circuit having a lowest depth.

8. The method of claim 7, wherein the threshold is about 698.

9. The method of claim 7, wherein n equals four.

10. The method of claim 7, wherein the logic circuit comprises data paths including at least one of binary adders, binary comparators, and locators of leading and trailing ones and zeros in binary numbers.

11. The method of claim 7, wherein the base algorithm comprises selecting a preexisting design having the least number of variables that is greater than N, and simplifying the preexisting design for N variables by setting constants to unused inputs and applying constant propagation.

* * * * *